United States Patent [19]

Thompson

[11] 4,334,754
[45] Jun. 15, 1982

[54] STROBOSCOPIC POSING AID

[76] Inventor: Timothy W. Thompson, 105 S. Madison, Anderson, Ind. 46011

[21] Appl. No.: 229,826

[22] Filed: Jan. 30, 1981

[51] Int. Cl.³ .............................................. G03B 15/06
[52] U.S. Cl. ..................................................... 354/290
[58] Field of Search ................... 354/80, 81, 290, 291, 354/292; 273/58

[56] References Cited

U.S. PATENT DOCUMENTS

| | | | |
|---|---|---|---|
| 2,606,025 | 8/1952 | Hornig | 273/58 C X |
| 3,332,686 | 7/1967 | Frost | 273/58 C X |
| 3,454,275 | 7/1969 | Pontone | 273/58 C X |
| 3,720,147 | 3/1973 | Bemis | 354/81 |
| 3,812,506 | 5/1974 | Klebanow | 354/290 X |
| 4,072,973 | 2/1978 | Mayo | 354/290 X |
| 4,121,829 | 10/1978 | Petrusek | 273/58 C X |

Primary Examiner—Donald A. Griffin
Attorney, Agent, or Firm—John H. Calhoun, Jr.

[57] ABSTRACT

A stroboscopic posing aid for use by professional and amateur photographers to capture and hold the attention of photographic subjects, especially small children, comprising a vertical stand having an arm extending outward therefrom, a sphere decorated with vertical stripes or zones of alternating contrasting colors, means for suspending the sphere from the arm, and a fluorescent light source. A user spins the sphere by hand and the characteristic flicker of the fluorescent light source produces stroboscopic effects on the surface of the sphere that give optical illusions of vertical stripes rotating first in one direction, then slowing down, stopping, and reversing direction as the rotational speed of the sphere drops due to atmospheric drag.

5 Claims, 2 Drawing Figures

STROBOSCOPIC POSING AID

BACKGROUND OF THE INVENTION

This invention relates to photographers' posing aids and more particularly to posing aids that employ stroboscopic effects to produce changing optical illusions that are capable of capturing and holding the attention of photographic subjects, particularly small children.

A common problem experienced by both professional and amateur photographers working with human subjects is to get the subject to assume and maintain a proper head and eye pose long enough for a photograph to be taken. The problem is particularly acute when the subject is a small child, because small children often do not understand a photographer's instructions and in addition they tend to be physically active, tend to have short attention spans and tend to be easily distracted by extraneous sounds or movements in the room. It is therefore not uncommon for a subject, especially a small child, to either fail to achieve the desired pose or to lose the pose before the photographer has time to take a photograph.

Numerous gimmicks have been employed in attempts to attract and hold a subject's attention, such as balancing, throwing, or suddenly displaying or concealing a toy such as a ball or doll. Another common practice is for another person, such as a parent, to call to or talk to the subject or clown around in front of the subject in the hope of attracting and holding the subject's attention. Presently known methods are ineffective in capturing and holding a subject's attention and they are lacking in means for precisely positioning a subject's head or precisely controlling the direction of view of a subject's eyes.

SUMMARY OF THE INVENTION

An object of the present invention is to provide a posing aid that will reliably capture and hold a photographic subject's attention, including subjects who are small children. Another object of the present invention is to provide a posing aid that will allow a photographer to precisely position a subject's head and precisely define the direction of view of a subject's eyes. Another object of the present invention is to provide a posing aid that can be used on subjects of all sizes and ages and which is capable of producing predictable and reproducible results. Another object of the present invention is to provide a posing aid that is simple in construction, strong, rigid, durable, reliable, well adapted for the purposes for which it is intended, and yet inexpensive to produce. Other objects and advantages of the present invention will become apparent from a consideration of the following detailed description taken in connection with the accompanying drawings wherein a preferred embodiment of the invention is shown. It should be understood that the invention is not limited to the details disclosed, but includes all such variations and modifications as fall within the spirit of the invention and the scope of the appended claims.

It has been found that subjects of all ages tend to become mesmerized by optical illusions produced by the stroboscopic effects of a light flashing on a spinning sphere decorated with alternating contrasting stripes parallel with the axis of rotation. When the product of the number of pairs of contrasting stripes times the rotational speed of the sphere in revolutions per second is equal to the flicker frequency of the light source in pulses per second an optical illusion is created suggesting that the sphere is stationary. At slightly higher rotational speeds the sphere will appear to rotate slowly in the direction of spin of the sphere, and at slightly lower rotational speeds the sphere will appear to rotate slowly in a direction opposite of that of the spin of the sphere. The rotational speed of a spinning sphere will diminish due to atmospheric drag until the sphere comes to rest. The mesmerizing effect is especially pronounced when the initial rotational speed of a sphere is such that vertical stripes appear to be moving slowly in the direction of spin, and thereafter appear to slow down, stop, and reverse direction as the sphere slows down due to the effects of atmospheric drag.

Operation of the present invention will best be understood by first considering the operation of incandescent and fluorescent lamps of the kinds commonly used to illuminate spaces in which photographic work is routinely done.

As is well known, an incandescent lamp comprises an electrical conductor or filament through which a current is passed which causes it to glow at white heat. In a typical installation employing a sinusoidal alternating current power source, current will pulse through the filament at a pulse rate equal to twice the line frequency, one pulse occurring during the positive going half-cycle and the other pulse occurring during the negative going half-cycle. The filament, however, is continuously maintained at a white hot temperature, even at times when there is little or no current flowing therethrough. Therefore, a light from an incandescent source is essentially continuous even though the current producing it is pulsating.

Fluorescent lamps are also commonly operated off sinusoidal alternating current power sources which provide a current which pulses at twice the line frequency, however in the case of a fluorescent lamp there is no white hot filament to sustain light emmission during periods of low current. A fluorescent lamp depends upon the secondary emmission of light by a light emitting coating on the inside of the fluorescent tube, and the persistence of the fluorescent particles in the coating. Fluorescent lamps therefore, do not provide a continuous light but rather a light that flickers. The flicker of a fluorescent lamp is capable of producing stroboscopic effects which, in turn, are capable of producing the optical illusion described hereinabove. The posing aid of the present invention makes use of the flicker characteristics of fluorescent lamps, and the posing aid of the present invention may be used in a room that is illuminated with fluorescent lighting or it may be used with a separate source of fluorescent lighting. However, the posing aid of the present invention will not operate satisfactorily in a room illuminated entirely by incandescent lighting or in natural light.

The objectives of the present invention are accomplished by providing a sphere of convenient size that is decorated with a plurality of alternating contrasting stripes or zones and which can be hung by a cord from an arm extending from a stand. The stand and arm may be of a telescoping type for convenience in adjusting the height of the stand and the distance of the sphere from the stand. The arm may be detachably or pivotally connected to the stand so that the posing aid may be disassembled or collapsed for convenient storage. A source of fluorescent lighting is provided in the form of a free standing fluorescent lamp or alternatively, a fluorescent lamp may be mounted on the stand. A separate fluorescent light source may not be required when photographs are being taken in a room that is illuminated by a suitable fluorescent light source.

A photographer sets up the posing aid so that when a subject stares at the sphere hanging from the arm, the subject's head and eye positions will be those desired by the photographer. The photographer or an assistant then spins the sphere in the presence of a flickering fluorescent light to produce the stroboscopic effects and optical illusions previously described herein. The effects and illusions capture and hold the subject's attention for a brief moment sufficiently long to allow the photographer to take one or more photographs of the subject.

BRIEF DESCRIPTION OF THE DRAWINGS

A preferred embodiment of the present invention is illustrated in the accompaning drawings, in which.

DESCRIPTION OF THE PREFERRED EMBODIMENT

Figure 1:
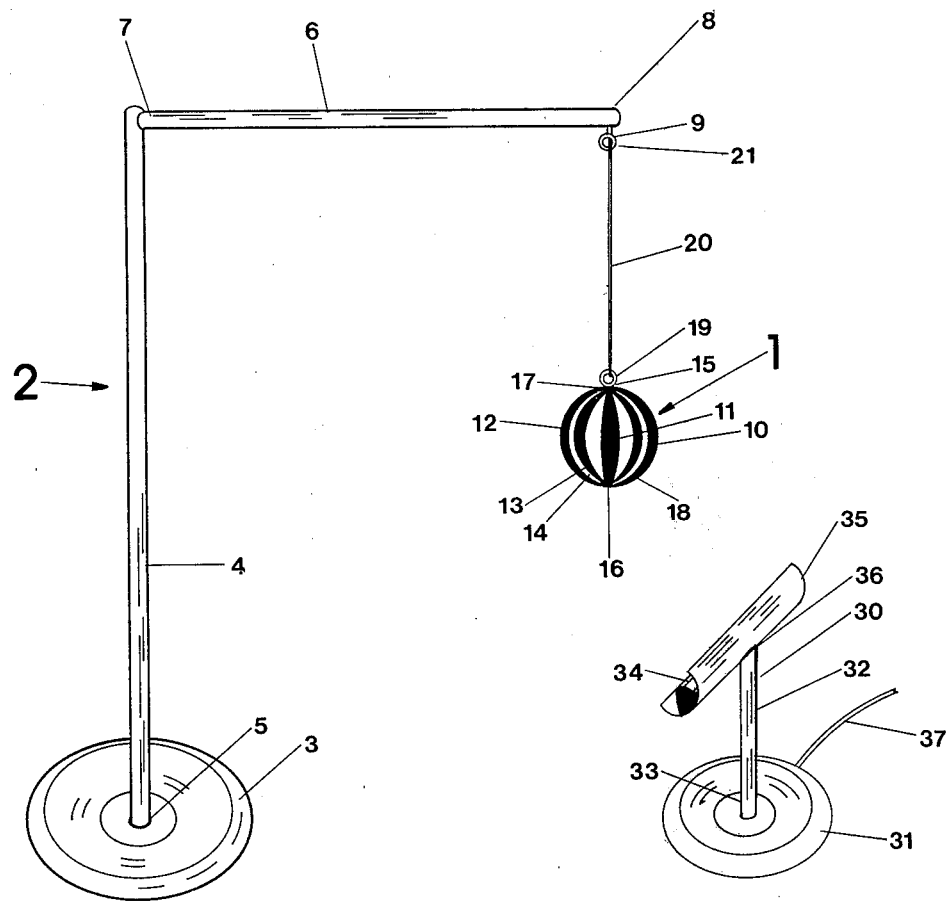
FIG. 1 is a view in perspective showing the posing aid of the present invention.

Referring now to the drawings in greater detail, FIG. 1 illustrates a posing aid constructed in accordance with the concepts of the present invention. The posing aid, shown generally at 1, comprises a stand 2 having a base 3 to which a vertical post 4 is attached, a vertical post 4 attached at one end 5 to the aforesaid base 3 and having an outward extending arm 6 attached at one end 7 thereof to the aforesaid post 4. Near the other end 8 of the aforesaid arm 6 a connection means 9 is provided for connecting a flexible cord to the aforesaid arm 6. The connection means 9 may be an eye screw, any connector providing a ring to which a flexible cord may be tied or otherwise attached, or any other suitable means may be provided to facilitate tieing or otherwise connecting one end of a flexible cord to the aforesaid arm 6.

Figure 2:
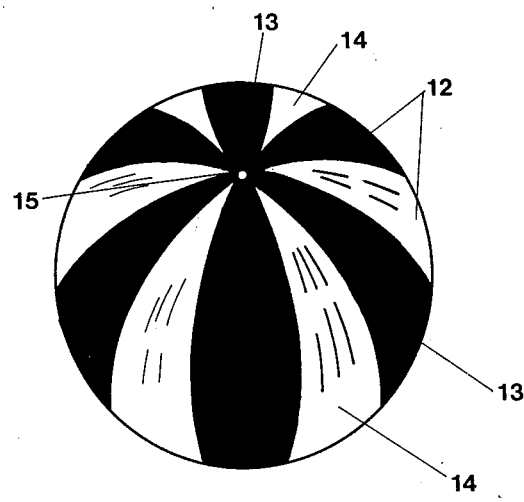
FIG. 2 is a top perspective view of the sphere of the present invention

Also provided is a spherical member 10 illustrated in FIGS. 1 and 2 and having a center 11 and an outer surface 12. The aforesaid outer surface 12 of the said sphere 10 is provided with a plurality of like zones 13, 14 of alternating contrasting colors such, for example, as alternating black zones 13 and white zones 14. Each zone 13, 14 originates at a first point 15 on the aforesaid outer surface 12 of the aforesaid sphere 10 and terminates at a second point 16 on the aforesaid outer surface 12 of the aforesaid sphere 10. The second point 16 is located on a side 18 of the said sphere 10 opposite of the side 17 on which the first point 15 is located, and the second point 16 is a point of intersection between a diagonal passing through the first point 15 and the center 11 of the sphere 10 with the outer surface 12 of the said sphere 10 on a side 18 of the said sphere 10 opposite of the side 17 of the said sphere 10 upon which the said first point 15 is located. Each zone 13, 14 comprises the outer surface of a wedge portion of the said sphere 10. The sphere 10 may be of any convenient size that can be easily grasped in a person's hand and spun.

A connection means 19 is attached to the said sphere 10 at either the aforesaid first point 15 or the aforesaid second point 16, which connection means 19 is adapted to receive an end of a flexible cord means tied or otherwise connected thereto. The said connection means 19 may be an eye screw, any connector providing a ring to which a flexible cord may be tied or otherwise attached, or any other suitable means may be provided to facilitate tieing or otherwise connecting one end of a flexible cord to the aforesaid sphere 10.

A flexible cord means 20 having two ends 21, 22 is provided. One end 21 of the aforesaid flexible cord 20 is tied, snapped, or otherwise connected to the aforesaid connector means 9 on the aforesaid arm 6, and the other end 22 of the said flexible cord 20 is tied, snapped, or otherwise connected to the aforesaid connector means 19 on the aforesaid sphere 10. When thus connected gravitational force will cause the sphere to hang by the flexible cord 20 from the arm 6 of the stand 2.

A fluorescent light source 30 is provided, and in the illustrated embodiment the said light source 30 is shown as a free standing fluorescent lamp comprising a base 31, a vertical support post 32 attached at one end 33 to the aforesaid base 31, and having a fluorescent tube 34 and a reflector 35 mounted at the other end 36 thereof. Fluorescent lamps are well known, and the said lamp is of known construction and is powered by an alternating current electrical power source indicated in FIG. 1 by the appliance cord 37.

It is well known that fluorescent tubes have a tendency to flicker. The flicker results in part from the fact that, unlike incandescent lamps, there is no white hot filiament in a fluorescent lamp to maintain light emmission during periods of low or zero electrical current that periodically occur in alternating current systems. In a 60 cycle per second system, for example, a fluorescent lamp may flicker at a flicker frequency of 120 times per second, ie. once for each positive going pulse of current and once for each negative going pulse of current.

The sphere 10 of the present invention is adapted to be easily grasped in a person's hand and spun while hanging by the flexible cord 20 from the arm 6 of the stand 2. The maximum rotational velocity of the sphere 10 will be determined primarily by the torque applied to the sphere 10, and rotational velocities of 20 or more revolutions per second are possible.

The zones 13, 14 are identical except for the previously described differences in color, and an even number of zones 13, 14 are provided on the outer surface 12 of the sphere 10. The number of zones will always be an even integer that can be obtained by dividing twice the flicker frequency in flashes per second by a sphere rotational velocity in revolutions per second that is somewhat less than the maximum achievable rotational velocity.

The sphere 10 shown in FIG. 2 is illustrated as having twelve zones. A sphere 10 having 12 zones will appear to be stationery when its outer surface is illuminated by a fluorescent light source that is operated by a 60 cycle per second alternating current electrical power source and having a flicker frequency of 120 flashes per second when the sphere 10 is spinning at 20 revolutions per second. At slightly higher rotational velocities the zones 13, 14 will appear to move in the direction of spin, and at slightly lower rotational velocities the zones 13, 14 will appear to move in a direction opposite of the direction of the spin. A sphere that is spun at a high rotational velocity and allowed to slow down due to atmospheric drag will produce optical illusions suggesting that the zones are slowing down, stopping, changing directions, and speeding up. The optical illusions will tend to capture and hold a photographic subject's attention, including the attention of small children. The head and eye positions of the subject will be determined by the location of the spinning sphere relative to the position of the subject. Repeatable and predictable performance may be achieved by controlling the position of the sphere relative to the position of the subject.

Having thus described my invention, what I claim is:

1. A photographer's posing aid comprising a sphere having an outer surface and having provided on the said outer surface thereof a plurality of zones of alternating contrasting colors, wherein the number of said zones is an even integer determined by dividing twice the flicker frequency of a fluorescent light source by a sphere rotational velocity, the said sphere being adapted to be suspended under the force of gravity by a flexible cord means from a support means and adapted to be grasped in a person's hand and spun; support means adapted to support the aforesaid sphere; flexible cord means having two ends wherein one end is connected to the aforesaid support means and the other end is connected to the aforesaid sphere, which cord means is adapted to support and suspend the aforesaid sphere from the aforesaid support means under the force of gravity; and a fluorescent light source adapted to illuminate the aforesaid outer surface of the aforesaid sphere, the said fluorescent light source comprising a fluorescent tube operated by an alternating current power source, the said tube being adapted to flicker.

2. A photographer's posing aid comprising a sphere having an outer surface and having provided on the said outer surface thereof by dying or other suitable means a plurality of zones of alternating contrasting colors, wherein the number of said zones is an even integer determined by dividing twice the flicker frequency of a fluorescent light source by a sphere rotational velocity, the said sphere being adapted to be suspended under the force of gravity by a flexible cord means from a support means and adapted to be grasped in a person's hand and spun; support means adapted to support the aforesaid sphere; flexible cord means having two ends wherein one end is connected to the aforesaid support means and the other end is connected to the aforesaid sphere, which cord means is adapted to support and suspend the aforesaid sphere from the aforesaid support means under the force of gravity; and a fluorescent light source adapted to illuminate the aforesaid outer surface of the aforesaid sphere, the said fluorescent light source comprising a fluorescent tube operated by an alternating current power source having a line frequency, the said tube being adapted to flicker at a frequency that is twice the aforesaid line frequency.

3. A photographer's posing aid comprising a sphere having an outer surface and having provided on the said outer surface thereof by dying or other suitable means a plurality of zones of alternating contrasting colors, wherein the number of said zones is an even integer determined by dividing twice the flicker frequency of a fluorescent light source by a sphere rotational velocity, the said sphere being adapted to be suspended under the force of gravity by a flexible cord means from a support means and adapted to be grasped in a person's hand and spun; support means adapted to support the aforesaid sphere, the said support means comprising a stand having a base to which a vertical post is attached, a vertical post having two ends which post is attached at one end to the aforesaid base and having an outward extending arm attached at the other end thereof; an arm having two ends which arm is attached at one end to the aforesaid post and which arm exends outward from the aforesaid post; flexible cord means having two ends wherein one end is connected to the aforesaid support means and the other end is connected to the aforesaid sphere, which cord means is adapted to support and suspend the aforesaid sphere from the aforesaid support means under the force of gravity; and a fluorescent light source adapted to illuminate the aforesaid outer surface of the aforesaid sphere, the said fluorescent light source comprising a fluorescent tube operated by an alternating current power source having a line frequency, the said tube being adapted to flicker at a frequency that is twice the aforesaid line frequency.

4. A photographer's posing aid comprising a sphere having a center and an outer surface and having provided on the said outer surface thereof by dying or other suitable means a plurality of zones of alternating contrasting colors, wherein the number of said zones is an even integer determined by dividing twice the flicker frequency of a fluorescent light source by a sphere rotational velocity and wherein each of the said zones originates at a first point on the aforesaid outer surface of the said sphere and terminates at a second point on the aforesaid outer surface of the said sphere, which second point is located on a side of the said sphere that is opposite of the side of the said sphere on which the first point is located and which second point is the point of intersection with the said opposite side of the aforesaid outer surface of the said sphere with a diagonal passing through the aforesaid first point and through the aforesaid center of the said sphere, and the said sphere being adapted to be suspended under the force of gravity by a flexible cord means from a support means and adapted to be grasped in a person's hand and spun; connection means attached to the aforesaid sphere at the aforesaid first point or the aforesaid second point and adapted to connect the aforesaid sphere to a flexible cord means, the said connector means comprising a ring connection; support means adapted to support the aforesaid sphere, the said support means comprising a stand having a base to which a vertical post is attached, a vertical post having two ends which post is attached at one end to the aforesaid base and having an outward extending arm attached at other end thereof; an arm having two ends which arm is attached at one end to the aforesaid post and which arm exends outward from the aforesaid post and is provided at the other end with connection means, which connection means is adapted to receive an end of a flexible cord means attached thereto, the said connection means comprising a ring connector; flexible cord means having two ends wherein one end thereof is connected to the aforesaid outer end of the aforesaid arm and the other end is connected to the aforesaid ring connector attached to the aforesaid sphere at the aforesaid first point or the aforesaid second point, which cord means is adapted to support and suspend the aforesaid sphere from the aforesaid arm under the force of gravity; and a fluorescent light source adapted to illuminate the aforesaid outer surface of the aforesaid sphere, the said fluorescent light source comprising a fluorescent tube operated by an alternating current power source having a line frequency, the said tube being adapted to flicker at a frequency that is twice the aforesaid line frequency.

5. A photographer's posing aid comprising a sphere having an outer surface and having provided on the said outer surface thereof a plurality of zones of alternating contrasting colors, wherein the number of said zones is an even integer determined by dividing twice the flicker frequency of a fluorescent light source by a sphere rotational velocity, the said sphere being adapted to be suspended under the force of gravity by a flexible cord means from a support means; support means adapted to support the aforesaid sphere; flexible cord means having two ends wherein one end is connected to the aforesaid support means and the other end is connected to the aforesaid sphere, which cord means is adapted to support and suspend the aforesaid sphere from the aforesaid support means under the force of gravity; and a fluorescent light source adapted to illuminate the aforesaid outer surface of the aforesaid sphere.

* * * * *